United States Patent
Lee

(10) Patent No.: US 11,183,695 B2
(45) Date of Patent: Nov. 23, 2021

(54) HEAT TREATMENT METHOD FOR A CARBON-SUPPORTED METAL CATALYST FOR FUEL CELLS AND A CARBON-SUPPORTED METAL CATALYST PREPARED THEREBY

(71) Applicants: HYUNDAI MOTOR COMPANY, Seoul (KR); KIA MOTORS CORPORATION, Seoul (KR)

(72) Inventor: Ju Hee Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 87 days.

(21) Appl. No.: 16/435,202

(22) Filed: Jun. 7, 2019

(65) Prior Publication Data
US 2020/0212453 A1 Jul. 2, 2020

(30) Foreign Application Priority Data
Dec. 26, 2018 (KR) .................. 10-2018-0169504

(51) Int. Cl.
| | | |
|---|---|---|
| *H01M 4/92* | (2006.01) | |
| *H01M 4/88* | (2006.01) | |
| *H01M 4/90* | (2006.01) | |
| *H01M 8/1018* | (2016.01) | |

(52) U.S. Cl.
CPC ......... *H01M 4/926* (2013.01); *H01M 4/8882* (2013.01); *H01M 4/9083* (2013.01); *H01M 2008/1095* (2013.01)

(58) Field of Classification Search
CPC .................................................. H01M 4/9083
See application file for complete search history.

(56) References Cited

U.S. PATENT DOCUMENTS

| | | | |
|---|---|---|---|
| 2005/0037920 A1* | 2/2005 | Devenney ............. | H01M 4/921 502/313 |
| 2007/0037696 A1* | 2/2007 | Gorer .................. | H01M 4/9083 502/177 |
| 2014/0323292 A1* | 10/2014 | Luhrs .................. | B01J 37/0036 502/182 |

OTHER PUBLICATIONS

Yao (Carbothermal shock synthesis of high-entropy-alloy nanoparticles, Science 359, 1489-1494, Mar. 30, 2018).*

* cited by examiner

*Primary Examiner* — Jun Li
(74) *Attorney, Agent, or Firm* — Lempia Summerfield Katz LLC

(57) ABSTRACT

A heat treatment method performed to form a particle structure of a carbon-supported metal catalyst includes preparing the carbon-supported metal catalyst by supporting metals on a support including carbon. The heat treatment method also includes applying heat shock to the carbon-supported metal catalyst. The applying heat shock to the carbon-supported metal catalyst includes raising a temperature of the carbon-supported metal catalyst to a first temperature and lowering the temperature of the carbon-supported metal catalyst to a second temperature. A difference between the first temperature and the second temperature is 500° C. to 1,100° C. The applying heat shock to the carbon-supported metal catalyst is repeated at least once. A carbon-supported metal catalyst is prepared by the heat treatment method.

13 Claims, 6 Drawing Sheets

HEAT TREATMENT METHOD FOR A CARBON-SUPPORTED METAL CATALYST FOR FUEL CELLS AND A CARBON-SUPPORTED METAL CATALYST PREPARED THEREBY

CROSS-REFERENCE TO RELATED APPLICATION

This application claims under 35 U.S.C. § 119(a) the benefit of priority to Korean Patent Application No. 10-2018-0169504 filed on Dec. 26, 2018, the entire contents of which are incorporated herein by reference.

BACKGROUND

(a) Technical Field

The present disclosure relates to a heat treatment method for a carbon-supported metal catalyst for fuel cells and a carbon-supported metal catalyst prepared thereby.

(b) Background Art

A polymer electrolyte membrane fuel cell (PEMFC) is a high-power fuel cell having a high current density. The PEMFC requires securement of high power performance of several tens of kilowatts (kW) or more under various driving conditions for application of vehicles. For example, the PEMFC requires stable operation within a wide current, i.e., density range, exclusion of water leakage, rapid driving, and the like.

Reaction to generate electricity in a fuel cell happens in a membrane electrode assembly (MEA) including an ionomer-based electrolyte membrane and electrodes, i.e., an anode and a cathode. In order to increase performance of the electrodes for PEMFCs, it is necessary to enhance proton conductivity and hydrophilicity of the electrodes and catalysts included in the electrodes. Accordingly, alloy catalysts may be used as catalysts for fuel cells. Technology may be used that increases activity of the catalyst through heat treatment when an alloy catalyst for fuel cells is manufactured.

Further, research is underway to lower the production cost of a fuel cell while maintaining activity of a catalyst. This research may include a conventionally used carbon-supported platinum (Pt/C) catalyst being alloyed with a transition metal, which is relatively easy to obtain and has a low unit price, to reduce a platinum content and to increase performance. Various methods of synthesizing a multicomponent alloy catalyst have been researched and in most of these methods, ultra-high-temperature heat treatment is essentially performed finally to secure crystallinity of the alloy catalyst.

In a chemical mechanism, when nanoparticles are continuously heat-treated at a temperature of hundreds of degrees Celsius (° C.), particle growth is inevitable. Such particle growth may be caused by, for example, a nano-size effect. The nano-size effect means a phenomenon in which, for example, in alloy catalyst particles (for example, platinum-nickel alloy catalyst ($Pt_2Ni/C$) particles), physical properties of the alloy catalyst particles are changed at a lower temperature than a phase transition temperature displayed on a phase diagram. Such a nano-size effect may refer to a phenomenon in which, as the size of particles is reduced to a nano-scale, physical properties of the particles are changed. For example, the phase diagram is ignored, and mobility of the particles is increased at a lower temperature than the phase transition temperature displayed on the phase diagram.

An electrochemically active surface area (ECSA) of manufactured catalyst particles in catalytic reaction may be reduced according to growth of the catalyst particles, thus lowering performance and durability of a fuel cell.

Therefore, in general, when an alloy catalyst is manufactured, nanoparticles are coated with a polymer. High-temperature heat treatment is then carried out thereon, thus preventing growth of the catalyst particles during the high-temperature heat treatment. Further, after such a heat treatment process, an etching process, such as sulfuric acid or ozone treatment, is essentially carried out to remove the coated polymer. Various qualitative analyses may be performed to confirm whether or not the polymer is properly removed.

However, the above-described heat treatment process after coating using the polymer may cause complexity in processes and thus cause increase in process time and a rise in process cost. Accordingly, an effective heat treatment method of a metal catalyst for fuel cells to maintain and enhance performance without increase in the number of processes has been required.

SUMMARY OF THE DISCLOSURE

The present disclosure has been made in an effort to solve the above-described problems associated with the prior art. It is an object of the present disclosure to provide a heat treatment method of a carbon-supported metal catalyst for fuel cells which applies heat shock in a quenching manner to maintain and enhance activity of the catalyst while preventing growth of particles of the catalyst.

It is another object of the present disclosure to provide a heat treatment method of a carbon-supported metal catalyst for fuel cells which may form and control a particle structure of the catalyst not to reduce activity of the catalyst and a specific surface area of the catalyst per metal mass.

It is yet another object of the present disclosure to provide a heat treatment method of a carbon-supported metal catalyst for fuel cells which is executed without any additional process, such as coating and removal of a polymer protective layer, to prevent growth of catalyst particles.

In one aspect, the present disclosure includes a heat treatment method of a carbon-supported metal catalyst for fuel cells performed to form a particle structure of the carbon-supported metal catalyst. The heat treatment method may include preparing the carbon-supported metal catalyst by supporting metals on a support including carbon and applying heat shock to the carbon-supported metal catalyst. The applying heat shock to the carbon-supported metal catalyst may include raising a temperature of the carbon-supported metal catalyst to a first temperature and lowering the temperature of the carbon-supported metal catalyst to a second temperature. A difference between the first temperature and the second temperature is 500° C. to 1,100° C. The applying heat shock to the carbon-supported metal catalyst may be repeated at least once.

In an embodiment, the preparing the carbon-supported metal catalyst may include preparing the carbon-supported metal catalyst ($L_xM_y/C$, x and y being numbers which are 1 or more) by supporting a first metal (L) and a second metal (M) differing from the first metal (L) on the support including carbon (C).

In another embodiment, the first metal may include one or more selected from the group consisting of platinum (Pt), iridium (Ir), osmium (Os), rhodium (Rh), ruthenium (Ru), palladium (Pd), gold (Au) and silver (Ag).

In still another embodiment, the second metal may include one or more selected from the group consisting of cobalt (Co), Iron (Fe), nickel (Ni), manganese (Mn), copper (Cu), scandium (Sc), titanium (Ti), vanadium (V), chrome (Cr), zirconium (Zr), yttrium (Y), niobium (Nb), molybdenum (Mo), ruthenium (Ru), rhodium (Rh), palladium (Pd), cadmium (Cd), iridium (Ir) and silver (Ag).

In yet another embodiment, the preparing the carbon-supported metal catalyst may include preparing the carbon-supported metal catalyst ($L_xM_yN_z/C$, x, y and z being numbers which are 1 or more) by further supporting a third metal (N) differing from the first metal (L) and the second metal (M) on the support including carbon (C).

In still yet another embodiment, the third metal may include one or more selected from the group consisting of cobalt (Co), iron (Fe), nickel (Ni), manganese (Mn), copper (Cu), scandium (Sc), titanium (Ti), vanadium (V), chrome (Cr), zirconium (Zr), yttrium (Y), niobium (Nb), molybdenum (Mo), ruthenium (Ru), rhodium (Rh), palladium (Pd), cadmium (Cd), iridium (Ir) and silver (Ag).

In a further embodiment, in the applying heat shock to the carbon-supported metal catalyst, the first temperature may be within a range of 500° C. to 1,100° C.

In another further embodiment, in the applying heat shock to the carbon-supported metal catalyst, the second temperature may be within a range of 0° C. to 100° C.

In still another further embodiment, in the applying heat shock to the carbon-supported metal catalyst, the raising the temperature of the carbon-supported metal catalyst to the first temperature may be performed for 1 sec to 30 sec.

In yet another further embodiment, in the applying heat shock to the carbon-supported metal catalyst, the lowering the temperature of the carbon-supported metal catalyst to the second temperature may be performed for 1 sec to 30 sec.

In still yet another further embodiment, in the applying heat shock to the carbon-supported metal catalyst, the lowering the temperature of the carbon-supported metal catalyst to the second temperature may be performed at an average speed of 16.6° C./sec to 1,100° C./sec.

In a still further embodiment, in the applying heat shock to the carbon-supported metal catalyst, the lowering the temperature of the carbon-supported metal catalyst to the second temperature is performed after the carbon-supported metal catalyst, the temperature of which was raised to the first temperature, may be maintained at the first temperature for 1 sec to 1,800 sec.

In a yet still further embodiment, in the applying heat shock to the carbon-supported metal catalyst, the raising the temperature of the carbon-supported metal catalyst to the first temperature is performed after the carbon-supported metal catalyst, the temperature of which was lowered to the second temperature, may be maintained at the second temperature for 1 sec to 900 sec.

In another embodiment, the applying heat shock to the carbon-supported metal catalyst may be repeated 30 times to 1,200 times.

In still another embodiment, the applying heat shock to the carbon-supported metal catalyst may be performed for 5 sec to 3,600 sec.

In yet another embodiment, the applying heat shock to the carbon-supported metal catalyst may include feeding the carbon-supported metal catalyst into an alumina boat. The applying heat shock to the carbon-supported metal catalyst may also include inserting the alumina boat into a tube furnace and withdrawing the inserted alumina boat from the tube furnace. The inserting the alumina boat into the tube furnace and the withdrawing the inserted alumina boat from the tube furnace may be repeated at least once.

In still yet another embodiment, the inserting the alumina boat into the tube furnace and the withdrawing the inserted alumina boat from the tube furnace may be repeated 30 times to 1,200 times.

In a further embodiment, the tube furnace may include hydrogen gas ($H_2$).

In another aspect, the present disclosure includes a carbon-supported metal catalyst prepared by the above-described heat treatment method.

In an embodiment, an average particle size of the carbon-supported metal catalyst may be 0.01 nm to 20 nm.

Other aspects and embodiments of the disclosure are discussed infra.

The above and other features of the disclosure are discussed infra.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure.

Figure 1:
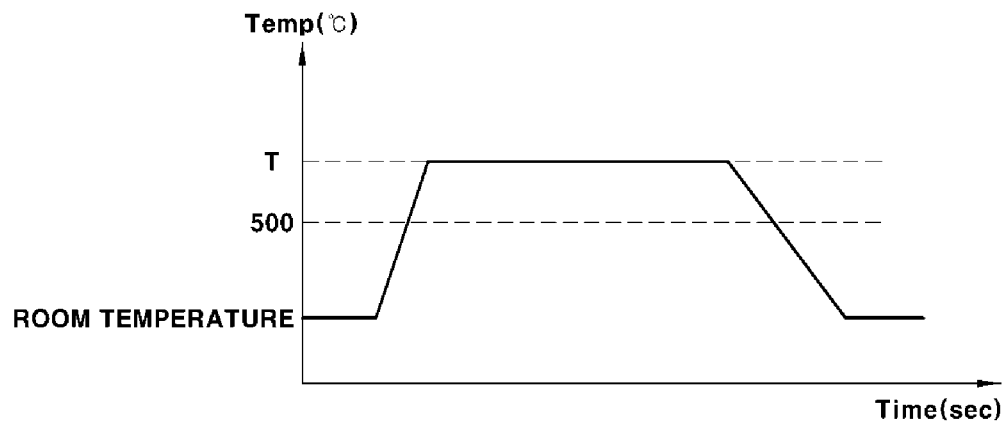
FIG. 1 is a graph showing temperature change in a conventional heat treatment method of a carbon-supported metal catalyst.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

Hereinafter, reference is made in detail to various embodiments of the present disclosure, examples of which are illustrated in the accompanying drawings and described below. While the disclosure is described in conjunction with various embodiments, it will be understood that the present description is not intended to limit the disclosure to the specific embodiments described and illustrated herein. On the contrary, the disclosure is intended to cover not only the various embodiments, but also various alternatives, modifications, equivalents and other embodiments within the spirit and scope of the disclosure as defined by the appended claims. In the following description of the embodiments, the same elements are denoted by the same reference numerals even though they are depicted in different drawings.

Unless stated as having other definitions, all terms (including technical and scientific terms) used in the following description of the embodiments will be interpreted as having meanings which those of ordinary skill in the art can understand. Also, terms which are defined in generally used dictionaries are not to be interpreted ideally or excessively unless clearly defined as having special meanings.

Also, terms used in the description of the embodiments serve merely to describe the embodiments and do not limit the present disclosure. In the description of the embodiments, singular expressions may encompass plural expressions, unless they have clearly different contextual meanings. In the following description of the embodiments, the terms, such as "comprising", "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, the term "and/or" will be interpreted as including each of stated items and all combinations of one or more thereof.

Also, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected. Thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when a range of variables is stated, the variables include all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Further, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

Hereinafter, the present disclosure is described in detail with reference to the accompanying drawings.

FIG. 1 is a graph showing temperature change in a conventional heat treatment method of a carbon-supported metal catalyst.

Referring to FIG. 1, for example, in a platinum-nickel alloy catalyst ($Pt_2Ni/C$), the temperature of platinum-nickel particles ($Pt_2Ni$) may be raised to a target temperature T (for example, 950° C.) to impart crystallinity to have optimum activity in oxygen reduction reaction (ORR).

Further, heat applied during a heat treatment process in a general furnace (for example, a tube furnace) may include heat which nano-sized catalyst particles receive during a temperature raising process. Heat applied during the heat treatment process may further include heat which the catalyst particles receive during a time to maintain the target temperature T. Heat applied during the heat treatment process may also include heat which the catalyst particles receive during a process of lowering the target temperature (t) to room temperature after heat treatment.

Due to high-temperature heat treatment and continuous heat application for a designated time (for example, 30 minutes), nanoparticles of the metal catalyst may be grown. Thus, a specific surface area of the metal catalyst per unit mass may be reduced and activity of the metal catalyst may be reduced.

Figure 2:
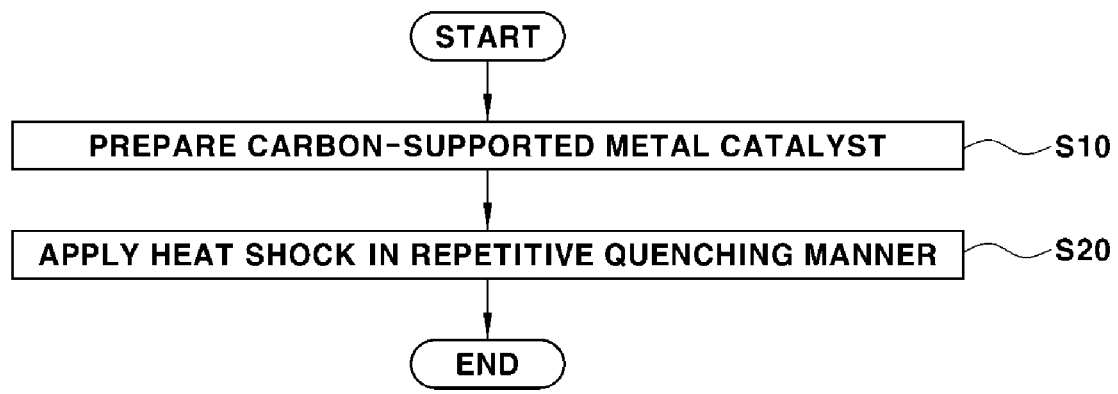
FIG. 2 is a flowchart illustrating a heat treatment method of a carbon-supported metal catalyst in accordance with one embodiment of the present disclosure.
Figure 3:
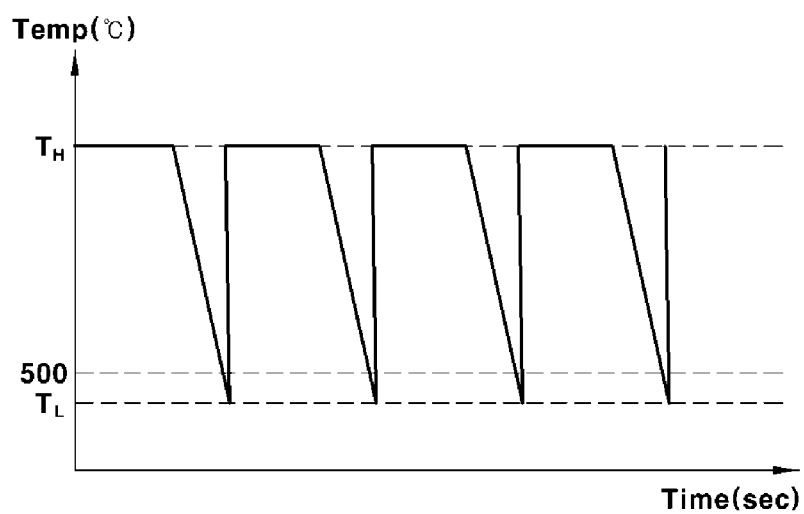
FIG. 3 is a graph showing temperature change in the heat treatment method in accordance with one embodiment of the present disclosure.

FIG. 2 is a flowchart illustrating a heat treatment method of a carbon-supported metal catalyst in accordance with one embodiment of the present disclosure. FIG. 3 is a graph showing temperature change in the heat treatment method in accordance with one embodiment of the present disclosure.

Referring to FIG. 2, the heat treatment method to form a particle structure of the catalyst, in accordance with one embodiment of the present disclosure, may include preparing the carbon-supported metal catalyst by supporting metals on a support including carbon C (S10). The heat treatment method may further include applying heat shock to the carbon-supported metal catalyst, to which crystallinity is not imparted, in a quenching manner (S20). In more detail, the applying heat shock (S20) may include raising the temperature of the carbon-supported metal catalyst to a first temperature and lowering the temperature of the carbon-supported metal catalyst to a second temperature. Particularly, in several embodiments of the present disclosure, a difference between the first temperature and the second temperature may be 500° C. to 1,100° C. Further, the applying heat shock (S20) may be repeated at least once.

The preparing the carbon-supported metal catalyst (S10) in accordance with one embodiment of the present disclosure may include preparing the carbon-supported metal catalyst ($L_xM_y/C$, x and y being numbers which are 1 or more) by supporting a first metal L and a second metal M differing from the first metal L on the support including carbon C.

Further, the first metal L may be, for example, a noble metal. For example, the first metal L may include one or more selected from the group consisting of platinum (Pt), iridium (Ir), osmium (Os), rhodium (Rh), ruthenium (Ru), palladium (Pd), gold (Au) and silver (Ag), without being limited thereto.

Further, the second metal M may be, for example, a transition metal corresponding to one of group III or group XII on the periodic table. For example, the second metal M may include one or more selected from the group consisting of cobalt (Co), iron (Fe), nickel (Ni), manganese (Mn), copper (Cu), scandium (Sc), titanium (Ti), vanadium (V), chrome (Cr), zirconium (Zr), yttrium (Y), niobium (Nb), molybdenum (Mo), ruthenium (Ru), rhodium (Rh), palladium (Pd), cadmium (Cd), iridium (Ir) and silver (Ag), without being limited thereto.

The preparing the carbon-supported metal catalyst (S10) in accordance with one embodiment of the present disclosure may include preparing a ternary metal catalyst as well as preparing a binary metal catalyst. In other words, the preparing the carbon-supported metal catalyst (S10) may include, for example, preparing the carbon-supported metal catalyst ($L_xM_yN_z/C$, x, y and z being numbers which are 1 or more) by further supporting a third metal N differing from the first metal L and the second metal M on the support including carbon C.

Further, the third metal N may include one or more selected from the group consisting of cobalt (Co), iron (Fe), nickel (Ni), manganese (Mn), copper (Cu), scandium (Sc), titanium (Ti), vanadium (V), chrome (Cr), zirconium (Zr), yttrium (Y), niobium (Nb), molybdenum (Mo), ruthenium (Ru), rhodium (Rh), palladium (Pd), cadmium (Cd), iridium (Ir) and silver (Ag), without being limited thereto.

In the preparing the carbon-supported metal catalyst (S10) in accordance with one embodiment of the present disclosure, the prepared carbon-supported metal catalyst may be one of various multicomponent metal catalysts as well as a binary or ternary metal catalyst.

Referring to FIG. 3, in the applying heat shock (S20 in FIG. 2) in accordance with one embodiment of the present disclosure, raising of the temperature of the carbon-supported metal catalyst to the first temperature $T_H$ and lowering of the temperature of the carbon-supported metal catalyst to the second temperature $T_L$ may be repeatedly performed. Further, as described above, in the applying heat shock (S20), the difference between the first temperature $T_H$ and the second temperature $T_L$ may be 500° C. to 1,100° C. Therefore, as compared to the conventional heat treatment method (with reference to FIG. 1), in several embodiments of the present disclosure, activity of the prepared carbon-supported metal catalyst may be maintained and enhanced while preventing growth of particles of the carbon-supported metal catalyst by applying heat shock at least once.

In the applying heat shock (S20), the first temperature $T_H$, the second temperature $T_L$, a temperature raising speed (i.e., a temperature raising time from the second temperature $T_L$ to the first temperature $T_H$), a temperature lowering speed (i.e., a temperature lowering time from the first temperature $T_H$ to the second temperature $T_L$), a maintaining time at the first temperature $T_H$, a maintaining time at the second temperature $T_L$, the number of repetitions of the applying heat shock (S20) and a total execution time may act as variables. In other words, heat shock applied to the carbon-supported metal catalyst prepared in earlier operation (S10 in FIG. 2) may be adjusted according to the above variables.

In connection with the first temperature $T_H$ and the second temperature $T_L$, in the applying heat shock (S20) in accordance with one embodiment of the present disclosure, the first temperature $T_H$ may be, for example, 500° C. to 1,100° C. When the first temperature $T_H$ is lower than 500° C., crystallinity of metal catalyst particles may not be sufficiently formed, and thus desirable activity of the carbon-supported metal catalyst may not be secured. Therefore, the first temperature $T_H$ should be 500° C. or higher. For example, the first temperature $T_H$ may be about 950° C., but is not limited thereto.

Further, the second temperature $T_L$ may be, for example, 0° C. to 100° C. Particularly, the second temperature $T_L$ may be room temperature, but is not limited thereto.

Further, in connection with the temperature raising time and the temperature lowering time (sec), in the applying heat shock (S20) in accordance with one embodiment of the present disclosure, the time taken to raise the temperature of the carbon-supported metal catalyst prepared in earlier operation (S10) to the first temperature $T_H$ may be, for example, 1 sec to 30 sec. Further, in the applying heat shock (S20), the time taken to lower the temperature of the carbon-supported metal catalyst to the second temperature $T_L$ may be, for example 1 sec to 30 sec. When the temperature raising time or the temperature lowering time is shorter than 1 sec, crystallinity of the metal catalyst particles may not be sufficiently formed. Additionally, when the temperature raising time or the temperature lowering time exceeds 30 sec, the metal catalyst particles are grown and thus activity of the carbon-supported metal catalyst may be lowered.

Further, as shown in the graph of the example depicted in FIG. 3, the temperature raising speed or the temperature lowering speed (° C./sec) is related with a slope of the graph. Therefore, when the slope of the graph is reduced to be less than a designated degree, the catalyst particles are grown. Thus, lowering of activity of the carbon-supported metal catalyst may be observed. For example, in the applying heat shock (S20), when the temperature of the carbon-supported metal catalyst is lowered to the second temperature $T_L$, the temperature of the carbon-supported metal catalyst may be lowered to the second temperature $T_L$ at an average speed of 16.6° C./sec to 1,100° C./sec.

Further, FIG. 3 illustrates the temperature raising speed or the temperature lowering speed as being linear, but the present disclosure is not limited thereto. For example, a temperature stagnation section may locally occur according to properties of the metal catalyst particles. In this case, the slope of the temperature change graph according to time may be replaced by an average temperature raising speed or an average temperature lowering speed (° C./sec), calculated by dividing a temperature raising degree or a temperature lowering degree (° C.) by the temperature raising time or the temperature lowering time (sec).

Further, in connection with the maintaining time at the first temperature $T_H$ and the maintaining time at the second temperature $T_L$, in the applying heat shock (S20), the carbon-supported metal catalyst, the temperature of which was raised to the first temperature $T_H$, may be maintained at the first temperature $T_H$, for example, for 1 sec to 1,800 sec. The temperature of the carbon-supported metal catalyst may then be lowered. Further, in the applying heat shock (S20), the carbon-supported metal catalyst, the temperature of which was lowered to the second temperature $T_L$, may be maintained at the second temperature $T_L$, for example, for 1 sec to 900 sec. The temperature of the carbon-supported metal catalyst may then be raised.

Further, in connection with the number of repetitions of the applying heat shock (S20), the applying heat shock (S20) may be repeated 30 times to 1,200 times. In other words, as described above, the raising the temperature of the carbon-supported metal catalyst to the first temperature $T_H$ and the lowering the temperature of the carbon-supported metal catalyst to the second temperature $T_L$, executed as one routine (S20), may be repeated 30 times to 1,200 times. When the applying heat shock (S20) is repeated less than 30 times (for example, 10 times), crystallinity of the metal catalyst particles may not be sufficiently formed. Thus, desirable activity of the carbon-supported metal catalyst may not be secured. In consideration of securement of crystallinity and activity of the carbon-supported metal catalyst and process efficiency, the applying heat shock (S20) may be repeated 30 times to 100 times, without being limited thereto. In other words, since alloying properties of the carbon-supported metal catalyst are varied according to mobility of the metals included in the carbon-supported metal catalyst, the number of repetitions of the applying heat shock (S20) may be varied. Specifically, for example, the carbon-supported metal catalyst including a metal having low mobility may require an increased number of repetitions of application of heat shock.

Further, in connection with the total execution time, the applying heat shock (S20) may be executed for 5 sec to 3,600 sec. For example, the raising the temperature of the carbon-supported metal catalyst to the first temperature $T_H$ and the lowering the temperature of the carbon-supported metal catalyst to the second temperature $T_L$, which are executed for 30 sec, may be repeated 30 times to 50 times. Thus, the total execution time of the applying heat shock (S20) may be 900 sec to 1,500 sec. However, the total execution time is not limited thereto.

A carbon-supported metal catalyst prepared by heat treatment methods in accordance with several embodiments of the preset disclosure may have an average particle size of 0.01 nm to 20 nm. The carbon-supported metal catalyst may have an average particle size of particularly 20 nm or less, and more particularly 10 nm or less.

Figure 4:
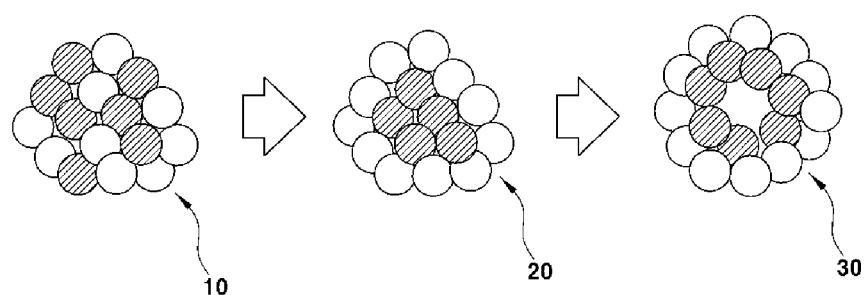
FIG. 4 is a view illustrating nanostructures of metal catalyst particles in heat treatment methods of a carbon-supported metal catalyst in accordance with several embodiments of the present disclosure.

FIG. 4 is a view illustrating nanostructures of metal catalyst particles prepared by heat treatment methods of a carbon-supported metal catalyst in accordance with several embodiments of the present disclosure.

Referring to FIG. 4, for example, metal catalyst particles including different metals (for example, binary metal catalyst particles including a first metal and a second metal) in an amorphous state 10 may be supported on a carbon (C) support before the applying heat shock (S20 in FIG. 2).

For example, platinum (Pt) may be used as the first metal, nickel (Ni) may be used as the second metal, and platinum-nickel particles in the amorphous state 10 may be supported on the carbon support ($Pt_2Ni/C$).

The metal catalyst particles in the amorphous state 10 may be changed to crystalline metal catalyst particles 20, in which different metals (for example, the first metal and the second metal) are divisionally distributed to a shell and a core by the applying heat shock (S20), in accordance with the embodiments of the present disclosure.

For example, if platinum (Pt) is used as the first metal and nickel (Ni) is used as the second metal, the platinum (Pt) particles are located at the shell and the nickel (Ni) particles are located at the core, thus forming such a core-shell structure 20. Therefore, an electrochemically active surface area (ECSA) of platinum (Pt) per mass of platinum (Pt) particles is increased to be greater than that of the amorphous metal catalyst particles 10. Thus, catalyst activity may be enhanced.

Further, the amorphous metal catalyst particles 10 and the crystalline metal catalyst particles 20 may be changed to crystalline metal catalyst particles 30, in which the different metals (for example, the first metal and the second metal) are divisionally distributed to the shell and the core. A hollow is formed at the center the core by the applying heat shock (S20), in accordance with the embodiments of the present disclosure.

For example, if platinum (Pt) is used as the first metal and nickel (Ni) is used as the second metal, a core-shell structure 30 in which the platinum (Pt) particles are located at the shell, the nickel (Ni) particles are located at the core and a hollow is formed at the center of the core may be formed. Thereby, mobility of the nickel (Ni) particles toward the shell is increased and uniformizes arrangement of the platinum (Pt) particles (shape control). Thus, the ECSA of platinum (Pt) per mass of platinum (Pt) particles may be secondarily further increased.

Figure 5:
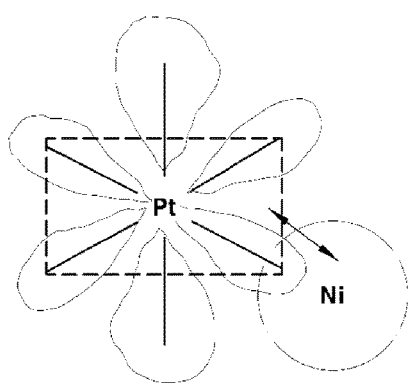
FIG. 5 is a view illustrating orbital relations between metals in the nanostructure example of FIG. 4.

FIG. 5 is a view illustrating orbital relations between the metals in the example of the particle structure depicted in FIG. 4 (i.e., platinum (Pt) is used as the first metal and nickel (Ni) is used as the second metal).

Referring to FIG. 5, an arrangement change in a crystal lattice (for example, a face-centered cubic (fcc) structure or a hexagonal close-packed (hcp) structure) may occur according to a degree of orbital band overlap between platinum (Pt) and nickel (Ni). The arrangement change may thus cause a difference in binding and dissociation force with oxygen molecules ($O_2$), thereby directly influencing performance of the catalyst and a catalytic reaction rate.

In more detail, the reason why crystallinity is important in a nanostructure of metal catalyst particles is that alloy catalyst nanoparticles (for example, a platinum-transition metal alloy) require a designated degree or more of crystallinity to expect activity in oxygen reduction reaction (ORR) of alloy particles. For example, the platinum-nickel catalyst particles in the amorphous state 10 (in FIG. 4) do not exhibit high activity, as compared to platinum (Pt) nanoparticles. However, when change in binding and dissociation force of the platinum-nickel catalyst particles with oxygen molecules ($O_2$) is caused according to a degree of orbital band overlap between platinum (Pt) and nickel (Ni), a rate of catalytic reaction may be determined (i.e., increased).

Figure 6:
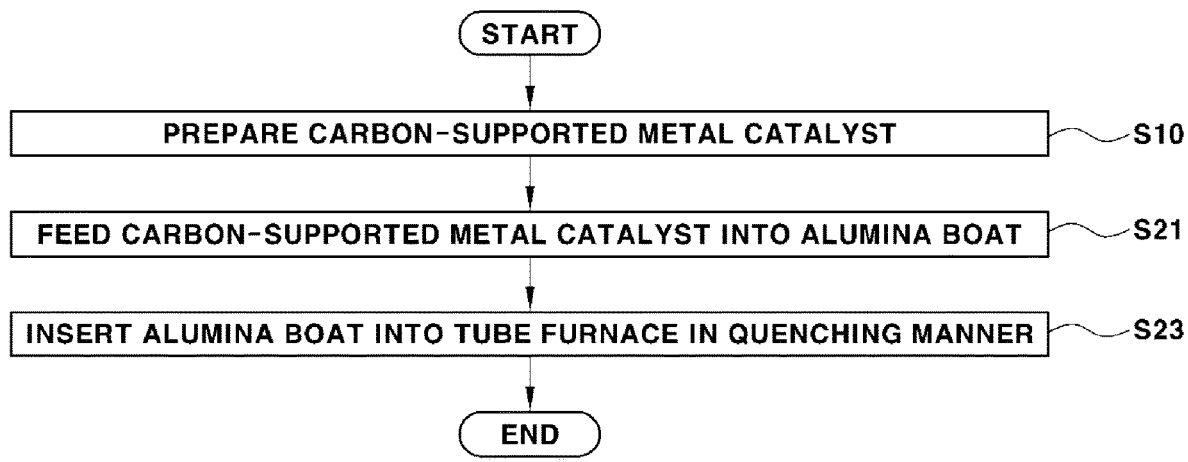
FIG. 6 is a flowchart illustrating a heat treatment method of a carbon-supported metal catalyst in accordance with another embodiment of the present disclosure.
Figure 7:
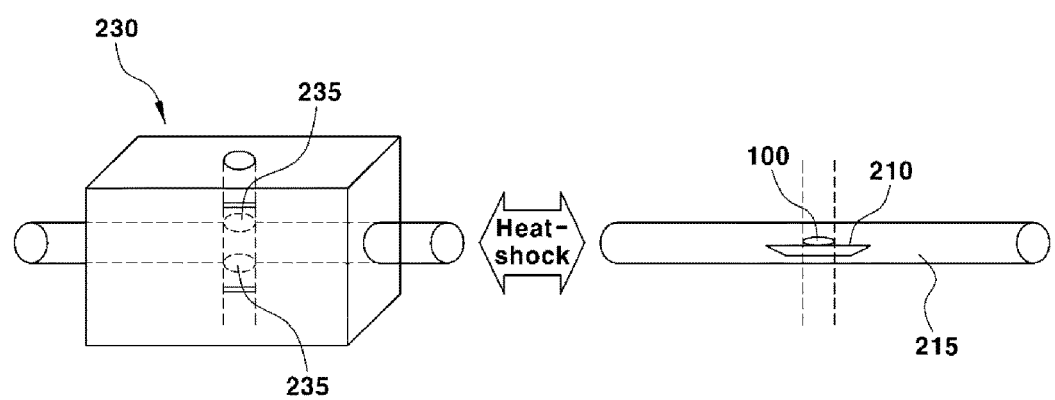
FIG. 7 is a view illustrating an apparatus for performing the heat treatment method of FIG. 6.
Figure 8:
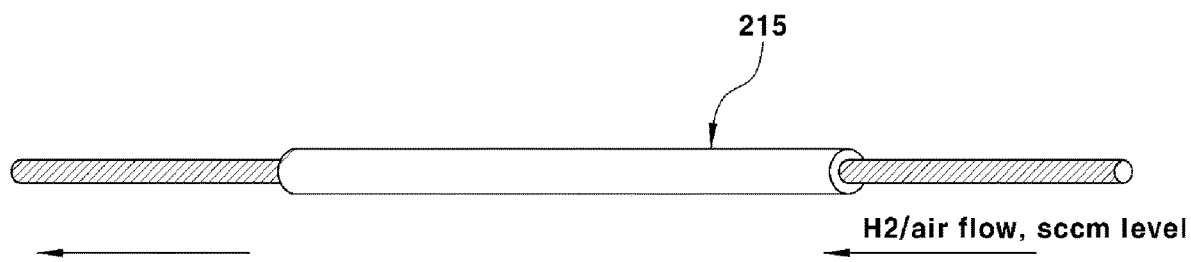
FIG. 8 is a view illustrating a tube furnace in the apparatus depicted in FIG. 7.

FIG. 6 is a flowchart illustrating a heat treatment method of a carbon-supported metal catalyst in accordance with another embodiment of the present disclosure. FIGS. 7 and 8 are views illustrating a heat treatment apparatus. For convenience of description, a detailed description of some parts in this embodiment, which are substantially the same as those in the embodiment shown in FIGS. 1 to 5, will be omitted because it is considered to be unnecessary.

First, referring to FIG. 6, applying heat shock in accordance with another embodiment of the present disclosure (with reference to S20 in FIG. 2), may include feeding a carbon-supported metal catalyst ($L_xM_y/C$) into an alumina boat (S21), inserting the alumina boat into a tube furnace and withdrawing the alumina boat from the tube furnace (S23). Further, the inserting the alumina boat into the tube furnace and the withdrawing the alumina boat from the tube furnace (S23) may be repeated at least once.

Further, in accordance with another embodiment of the present disclosure, the inserting the alumina boat into the tube furnace and the withdrawing the alumina boat from the tube furnace (S23) may be repeated, for example, 30 times to 1,200 times. Particularly, in consideration of securement of crystallinity and activity of the carbon-supported metal catalyst and process efficiency, the inserting the alumina boat into the tube furnace and the withdrawing the alumina boat from the tube furnace (S23) may be repeated 30 times to 100 times, without being limited thereto.

Thereafter, referring to FIG. 7, in accordance with another embodiment of the present disclosure, an apparatus for applying heat shock may include a heating apparatus 230 provided with a heat zone 235 connected to a heat source. Therefore, an amorphous carbon-supported metal catalyst 100 before crystallinity is imparted thereto may be fed into an alumina boat 210. Additionally, the alumina boat 210 may be disposed within a tube furnace 215. By inserting and withdrawing the tube furnace 215 into and from the heating apparatus 230, the carbon-supported metal catalyst 100 located in the alumina boat 210 may come into contact with or be separated from the heat zone 235. The alumina boat 210 may be stretched thinly in the tube furnace 215 so as to be within the area of the heat zone 235.

By inserting the tube furnace 215 into the heating apparatus 230, a momentary rise in the temperature of the carbon-supported metal catalyst 100 may be performed. For example, the heat zone 235 may have the first temperature $T_H$, and the tube furnace 215 may be placed at the inside of the heat zone 235 for 1 sec to 30 sec. Thereby, the temperature of the carbon-supported metal catalyst 100 located in the alumina boat 210 disposed within the tube furnace 215 may be raised to the first temperature $T_H$ within a time range of 1 sec to 30 sec.

Further, by withdrawing the tube furnace 215 from the heating apparatus 230, lowering of the temperature of the carbon-supported metal catalyst 100 may be performed. For example, the outside of the heating apparatus 230 may have the second temperature $T_L$. The tube furnace 215 may be placed at the outside of the heating apparatus 230 for 1 sec to 30 sec. Thereby, the temperature of the carbon-supported metal catalyst 100 located in the alumina boat 210 disposed within the tube furnace 215 may be lowered to the second temperature $T_L$ within a time range of 1 sec to 30 sec.

In more detail, by inserting and withdrawing the tube furnace 215 into and from the heating apparatus 230 at least once, the carbon-supported metal catalyst 100 located in the alumina boat 210 may come into contact with or be separated from the heat zone 235 at least once. Thereby, heat shock may be applied to the carbon-supported metal catalyst 100 at least once. In other words, a temperature difference (for example, a difference between the first temperature $T_H$ and the second temperature $T_L$) in the carbon-supported metal catalyst 100 may occur at least once.

The alumina boat 210 has no reactivity under a high-temperature and a reducing atmosphere and may thus favorably be used.

Thereafter, a structure of the tube furnace 215 is described with reference to FIG. 8.

Referring to FIG. 8, in order to perform reduction and heat treatment of the carbon-supported metal catalyst 100 disposed in the alumina boat 210 at a high temperature, the tube furnace 215 may include hydrogen gas ($H_2$).

Specifically, since the applying heat shock (S21 and S23) is reduction reaction of the metal catalyst particles at a high temperature, in which hydrogen gas ($H_2$) participates, the applying heat shock (S21 and S23) may be performed under a hydrogen atmosphere ($H_2$/air). Therefore, hydrogen gas ($H_2$) may consistently flow into the tube furnace 215 at a constant flow rate. In other words, since a reaction atmosphere is used as a reactant, the tube furnace 215 may be a closed system.

Hereinafter, the present disclosure is described in more detail through the following test examples and examples. The following examples serve merely to describe the present disclosure and are not intended to limit the scope of the disclosure.

Test Example 1: X-Ray Diffractometry (XRD)

First, a carbon-supported platinum catalyst (Pt/C) (sample 1), a platinum-nickel alloy catalyst ($Pt_2Ni/C$) having crystallinity which was manufactured by coating a polymer coating layer and then performing heat treatment at a temperature of 950° C. (sample 2), and a platinum-nickel alloy catalyst ($Pt_2Ni/C$) which was manufactured by performing heat treatment by applying heat shock in a repetitive quenching manner according to the present disclosure (sample 3) were prepared.

Particularly, the sample 3 was prepared through heat treatment by repeating a temperature raising and lowering routine, including raising the temperature of the platinum-nickel alloy catalyst ($Pt_2Ni/C$) in an amorphous state to a temperature of 950° C. for 30 sec and lowering the temperature of the platinum-nickel alloy catalyst ($Pt_2Ni/C$) in the amorphous state to room temperature for 30 sec, 50 times, without the coating process of the polymer coating layer which was performed to prepare the sample 2.

Figure 9:
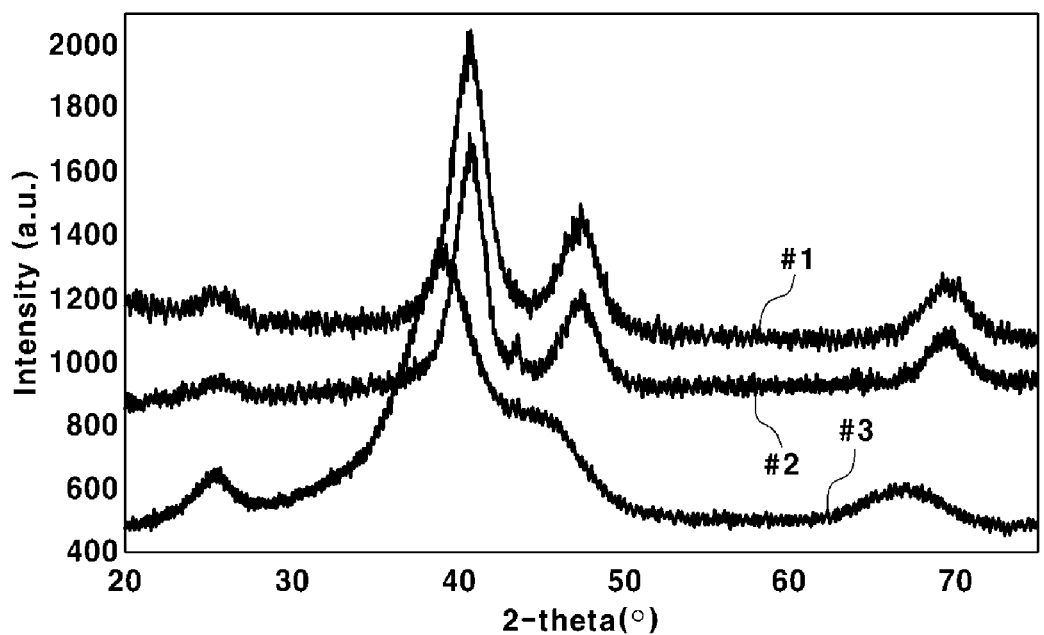
FIG. 9 is a graph showing results of X-ray diffractometry (XRD) of carbon-supported metal catalysts.

Referring to FIG. 9, results of X-ray diffractometry (XRD) of the respective samples 1, 2 and 3 may be observed. As the example shown in FIG. 9, it may be observed that the sample 3 prepared through heat treatment according to the present disclosure has very high crystallinity. Thus, improvement in catalyst activity will be expected.

Test Example 2: Analysis of Measurement Results of Cyclic Voltammetry (CV)

A manufacturing example of test samples was performed.
First, a powdery platinum-nickel alloy catalyst ($Pt_2Ni/C$) in an amorphous state (sample 100) was prepared.

Platinum-nickel alloy catalysts ($Pt_2Ni/C$) having crystallinity (samples 200 and 300) were prepared through heat treatment by applying heat shock in a repetitive quenching manner according to the present disclosure.

In order to increase crystallinity, the sample 200 was prepared through heat treatment by repeating a temperature raising and lowering routine. The heat treatment included raising the temperature of a platinum-nickel alloy catalyst ($Pt_2Ni/C$) in an amorphous state to a temperature of 950° C. for 30 sec and lowering the temperature of the platinum-nickel alloy catalyst ($Pt_2Ni/C$) in the amorphous state to room temperature for 30 sec, 30 times without the coating process of the polymer coating layer.

In order not only to increase crystallinity but also to achieve shape control of particles, the sample 300 was prepared through heat treatment by repeating a temperature raising and lowering routine, including raising the temperature of a platinum-nickel alloy catalyst ($Pt_2Ni/C$) in an amorphous state to a temperature of 950° C. for 30 sec and lowering of the temperature of the platinum-nickel alloy catalyst ($Pt_2Ni/C$) in the amorphous state to room temperature for 30 sec, 50 times without the coating process of the polymer coating layer.

Figure 10:
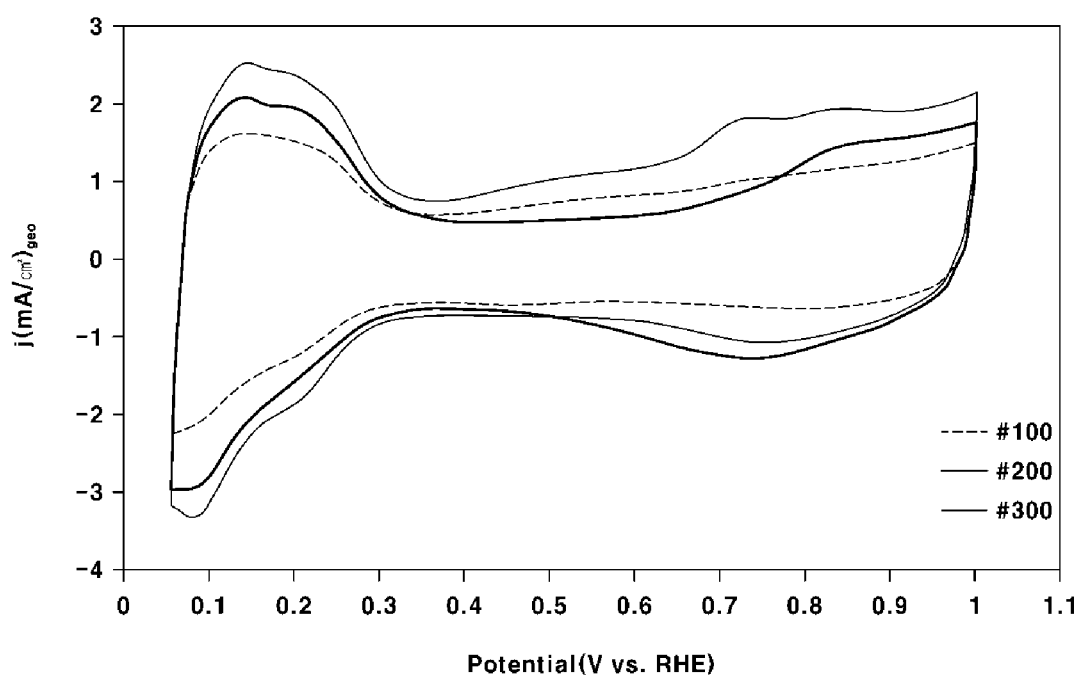
FIG. 10 is a graph showing measurement results of cyclic voltammetry (CV) of carbon-supported metal catalysts.

Referring to FIG. 10, measurement results of CV of the respective samples 100, 200 and 300 may be observed.

Through the above measurement results of CV, it may be confirmed that platinum (Pt) particles in the amorphous state having no specific arrangement (with reference to the sample 100) are moved to the shell. Additionally, an electrochemically active surface area (ECSA) of platinum (Pt) is primarily increased through shape control of metal catalyst particles by applying heat shock in the quenching manner (with reference to the sample 200). Further, it may be confirmed that mobility of the transition metal (for example, nickel (Ni)) located at the core toward the shell is increased and uniformizes arrangement of the platinum (Pt) particles through shape control. Thus, the ECSA of platinum (Pt) is secondarily further increased (with reference to the sample 300).

Test Example 3: Analysis of Measurement Results of Linear Sweep Voltammetry (LSV)

Figure 11:
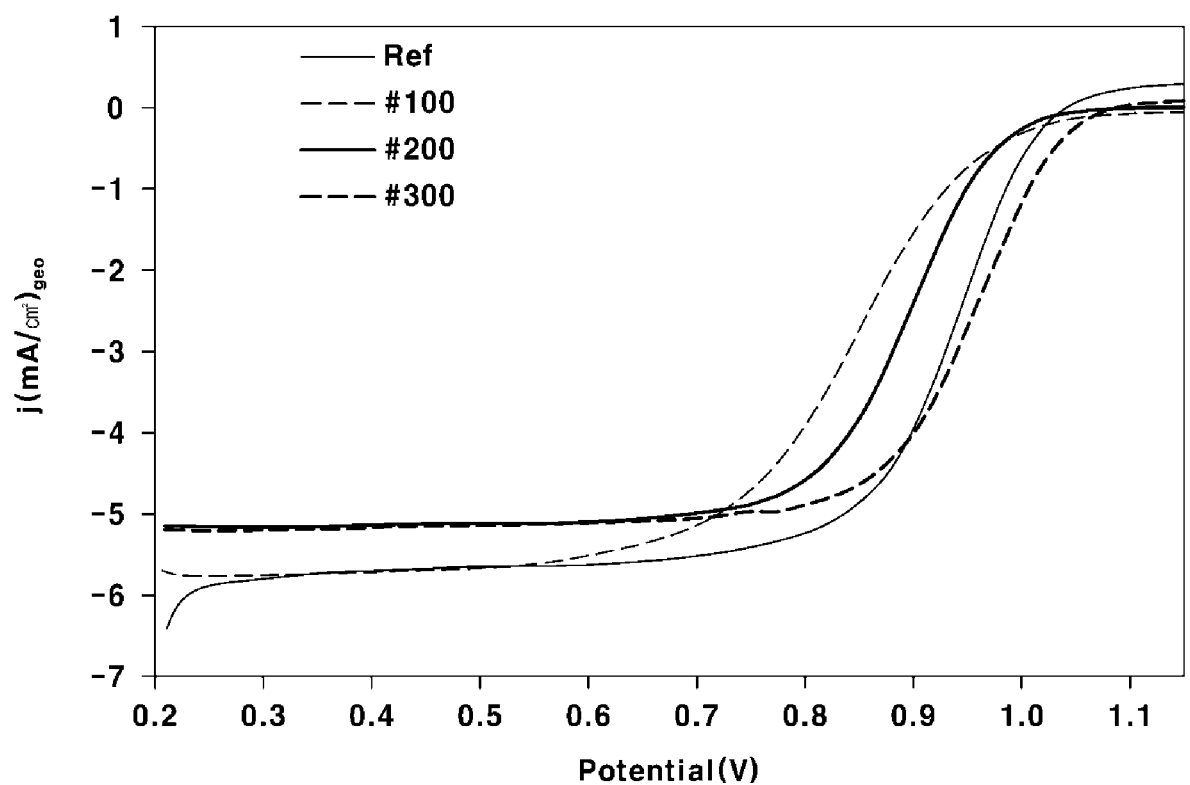
FIG. 11 is a graph showing measurement results of linear sweep voltammetry (LSV) of the carbon-supported metal catalysts.

Referring to FIG. 11, measurement results of LSV of the same samples 100, 200 and 300 as those in test example 2 may be observed.

The above measurement results of LSV, which are used as the most simple and important indexes to evaluate catalyst activity, may be obtained by performing oxygen reduction reaction (ORR) which is half-cell reaction. A degree of activity of a catalyst per unit area may be obtained by measuring half-wave potential and mass activity ($A/g_{Pt}$) after applying the current sweep.

In the case of the alloy catalysts (the samples 200 and 300) prepared by shape control, since it is difficult to quantify the platinum (Pt) catalyst per unit area and thus it is impossible to measure mass activity requiring a mass, catalyst activity was obtained through measurement of half-wave potential.

Through the measurement results, it may be confirmed that shape control proceeds in order of the samples 100, 200 and 300 so that activities of the catalysts are increased in this order, and thus activities of the alloy catalysts according to the present disclosure (the samples 200 and 300) are slightly increased as compared to the conventional alloy catalyst, i.e., the reference alloy catalyst (ref), prepared by coating the polymer protective layer. Therefore, since activities of the alloy catalysts according to the present disclosure are equal to or above activity of the conventional alloy catalyst (ref), it may be understood that the heat treatment method according to the present disclosure has great effects in terms of reduction in the number of processes and reduction of the costs of materials and subsidiary materials.

Test Example 4: Analysis of Transmission Electron Microscopy (TEM) Images

Figures 12A, 12B, 12C:
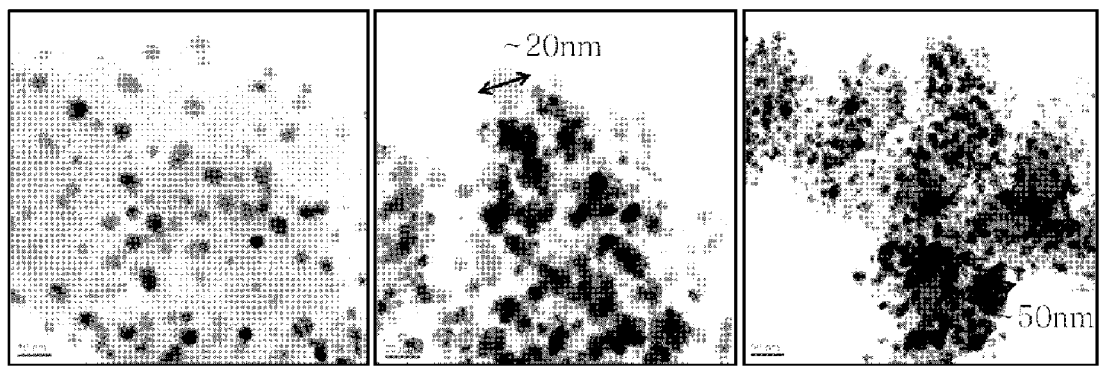
FIGS. 12(a)-12(c) are photographs representing transmission electron microscopy (TEM) images of carbon-supported metal catalysts.

FIG. 12($a$) is a photograph showing a TEM image of the sample 300 prepared in test example 2. FIGS. 12($b$) and 12($c$) are photographs representing TEM images of carbon-supported metal catalysts prepared by performing heat treatment at a temperature of 500° C. for 30 minutes to impart crystallinity to platinum-nickel alloy catalyst (Pt$_2$Ni/C) powder without coating of a polymer coating layer.

As shown in the example of FIGS. 12($b$) and 12($c$), if platinum-nickel alloy catalyst (Pt$_2$Ni/C) powder was heat-treated at 500° C. for 30 minutes, nanoparticles having an average particle size of 10 nm or more and the maximum particle size of 50 nm were observed. In other words, it may be confirmed that growth of the particles due to the nano-size effect was observed.

Therefore, it may be understood that, when heat treatment is performed at a high temperature for a comparatively long time, it is difficult to increase an electrochemically active surface area (ECSA) during catalytic reaction. Therefore, it may be inferred that reduction in the ECSA directly reduces mass activity of a catalyst.

Consequently, through such test example, it may be confirmed that, since heat treatment of a high temperature for a designated time or longer accompanies growth of powder particles, it is impossible to perform high-temperature heat treatment to impart high crystallinity to catalyst particles without coating of a protective layer. Further, in order to coat such a polymer protective layer, a process of coating the polymer protective layer (for example, an etching process) and a process of removing the coated polymer protective layer after heat treatment (or a process of washing additional organic impurities) are inevitably required. Addition of such processes complicates the heat treatment process and thus causes increase in production cost and increase in the number of necessary subsidiary materials when these processes are applied to preparation of a carbon-supported metal catalyst.

In contrast, as shown in the example depicted in FIG. 12($a$), it may be confirmed that the sample 300 prepared by the heat treatment method in accordance with the present disclosure (by applying heat shock in the repetitive quenching manner) did not exhibit particle growth due to the nano-size effect.

Therefore, in the heat treatment method of a carbon-supported metal catalyst for fuel cells according to several embodiments of the present disclosure, metal catalyst particles having crystallinity optimized for oxygen reduction reaction (ORR) may be formed while restricting growth of the metal catalyst particles. The structure of the metal catalyst particles may be shape-controlled and rearranged. In addition, since growth of the metal catalyst particles may be restricted and controlled without additional processes, such as coating of a polymer protective layer and removal of the polymer protective layer, economic effects due to process time reduction, energy saving and reduction in process cost may be expected.

As is apparent from the above description, by a heat treatment method of a carbon-supported metal catalyst for fuel cells according to several embodiments of the present disclosure, a carbon-supported metal catalyst having crystallinity optimized for oxygen reduction reaction (ORR) can be prepared while controlling the size of metal catalyst particles.

Further, the carbon-supported metal catalyst prepared by the heat treatment method according to several embodiments of the present disclosure can be prepared to have a particle structure desired according to heat treatment conditions. The particle structure of the carbon-supported metal catalyst can be shape-controlled and rearranged.

Moreover, the heat treatment method according to several embodiments of the present disclosure can restrict and control growth of the metal catalyst particles in a heat treatment process without additional processes, such as coating of a polymer protective layer and removal of the polymer protective layer, thus achieving process time reduction, energy saving and reduction in process cost.

The disclosure has been described in detail with reference to embodiments thereof. However, it will be appreciated by those of ordinary skill in the art that changes may be made in these embodiments without departing from the principles and spirit of the disclosure, the scope of which is defined in the appended claims and their equivalents.

What is claimed is:

1. A heat treatment method of a carbon-supported metal catalyst for fuel cells performed to form a particle structure of the carbon-supported metal catalyst, the heat treatment method comprising:
preparing the carbon-supported metal catalyst by supporting metals on a support comprising carbon; and
applying heat shock to the carbon-supported metal catalyst,
wherein the applying heat shock to the carbon-supported metal catalyst comprises raising a temperature of the carbon-supported metal catalyst to a first temperature and lowering the temperature of the carbon-supported metal catalyst to a second temperature, wherein:
a difference between the first temperature and the second temperature is 500° C. to 1,100° C.; and
the applying heat shock to the carbon-supported metal catalyst is repeated at least once,
wherein, in the applying heat shock to the carbon-supported metal catalyst, the second temperature is within a range of 0° C. to 100° C.,
wherein, in the applying heat shock to the carbon-supported metal catalyst, the lowering the temperature of the carbon-supported metal catalyst to the second temperature is performed at an average speed of 16.6° C./sec to 1,100° C./sec,
wherein, in the applying heat shock to the carbon-supported metal catalyst, the raising the temperature of the carbon-supported metal catalyst to the first temperature is performed for 1 sec to 30 sec,
wherein, in the applying heat shock to the carbon-supported metal catalyst, the lowering the temperature of the carbon-supported metal catalyst to the second temperature is performed after the carbon-supported metal catalyst, the temperature of which was raised to the first temperature, and wherein the first temperature is maintained for 1 sec to 1,800 sec, and
wherein the applying heat shock to the carbon-supported metal catalyst is repeated 30 times to 1,200 times to improve the crystallinity of the carbon-supported metal catalyst.

2. The heat treatment method of claim 1, wherein the preparing the carbon-supported metal catalyst comprises preparing the carbon-supported metal catalyst by supporting a first metal and a second metal differing from the first metal on the support comprising carbon, and
wherein the first metal is a noble metal, and
wherein the second metal is a transition metal of Group 3-12.

3. The heat treatment method of claim 2, wherein the first metal comprises one or more selected from the group consisting of platinum (Pt), iridium (Ir), osmium (Os), rhodium (Rh), ruthenium (Ru), palladium (Pd), gold (Au) and silver (Ag).

4. The heat treatment method of claim 2, wherein the second metal comprises one or more selected from the group consisting of cobalt (Co), iron (Fe), nickel (Ni), manganese (Mn), copper (Cu), scandium (Sc), titanium (Ti), vanadium (V), chrome (Cr), zirconium (Zr), yttrium (Y), niobium (Nb), molybdenum (Mo), ruthenium (Ru), rhodium (Rh), palladium (Pd), cadmium (Cd), iridium (Ir) and silver (Ag).

5. The heat treatment method of claim 2, wherein the preparing the carbon-supported metal catalyst comprises preparing the carbon-supported metal catalyst by further supporting a third metal differing from the first metal and the second metal on the support comprising carbon, and
wherein the first metal is a noble metal, and
wherein the second metal or the third metal are a transition metal of Group 3-12.

6. The heat treatment method of claim 5, wherein the third metal comprises one or more selected from the group consisting of cobalt (Co), iron (Fe), nickel (Ni), manganese (Mn), copper (Cu), scandium (Sc), titanium (Ti), vanadium (V), chrome (Cr), zirconium (Zr), yttrium (Y), niobium (Nb), molybdenum (Mo), ruthenium (Ru), rhodium (Rh), palladium (Pd), cadmium (Cd), iridium (Ir) and silver (Ag).

7. The heat treatment method of claim 1, wherein, in the applying heat shock to the carbon-supported metal catalyst, the first temperature is within a range of 500° C. to 1,100° C.

8. The heat treatment method of claim 1, wherein, in the applying heat shock to the carbon-supported metal catalyst, the lowering the temperature of the carbon-supported metal catalyst to the second temperature is performed for 1 sec to 30 sec.

9. The heat treatment method of claim 1, wherein, in the applying heat shock to the carbon-supported metal catalyst, the raising the temperature of the carbon-supported metal catalyst to the first temperature is performed after the carbon-supported metal catalyst, the temperature of which was lowered to the second temperature, is maintained at the second temperature for 1 sec to 900 sec.

10. The heat treatment method of claim 1, wherein the applying heat shock to the carbon-supported metal catalyst is performed for 5 sec to 3,600 sec.

11. The heat treatment method of claim 1, wherein the applying heat shock to the carbon-supported metal catalyst comprises:
feeding the carbon-supported metal catalyst into an alumina boat; and
inserting the alumina boat into a tube furnace and withdrawing the inserted alumina boat from the tube furnace,
wherein the inserting the alumina boat into the tube furnace and the withdrawing the inserted alumina boat from the tube furnace are repeated at least once.

12. The heat treatment method of claim 11, wherein the inserting the alumina boat into the tube furnace and the withdrawing the inserted alumina boat from the tube furnace are repeated 30 times to 1,200 times.

13. The heat treatment method of claim 11, wherein the tube furnace comprises hydrogen gas ($H_2$).

* * * * *